United States Patent
Palmer et al.

(10) Patent No.: US 7,383,298 B2
(45) Date of Patent: Jun. 3, 2008

(54) METHODS AND SYSTEMS FOR DYNAMIC, DISTRIBUTED LINK TABLE CONSISTENCY MANAGEMENT

(75) Inventors: Jonathan Palmer, Durham, NC (US); Devesh Agarwal, Raleigh, NC (US)

(73) Assignee: Tekelec, Morrisville, NC (US)

( * ) Notice: Subject to any disclaimer, the term of this patent is extended or adjusted under 35 U.S.C. 154(b) by 974 days.

(21) Appl. No.: 10/649,489

(22) Filed: Aug. 27, 2003

(65) Prior Publication Data

US 2005/0050224 A1 Mar. 3, 2005

(51) Int. Cl.
G06F 15/16 (2006.01)
G06F 15/173 (2006.01)

(52) U.S. Cl. .................................. 709/201; 709/242

(58) Field of Classification Search ................ 709/242, 709/250, 201; 707/101–104; 714/48, 52, 714/57
See application file for complete search history.

(56) References Cited

U.S. PATENT DOCUMENTS

| | | | |
|---|---|---|---|
| 5,542,047 A | 7/1996 | Armstrong | |
| 6,578,086 B1 * | 6/2003 | Regan et al. | 709/242 |
| 6,765,990 B2 * | 7/2004 | Freedman et al. | 379/32.05 |
| 6,895,088 B1 * | 5/2005 | Nelson et al. | 379/219 |
| 6,934,890 B2 * | 8/2005 | Lopke | 714/48 |
| 6,940,810 B1 * | 9/2005 | Roa-Diaz | 370/217 |
| 7,036,066 B2 * | 4/2006 | Weibel et al. | 714/752 |
| 2002/0054593 A1 * | 5/2002 | Morohashi et al. | 370/386 |

* cited by examiner

*Primary Examiner*—William Vaughn
*Assistant Examiner*—Kristie D Shingles
(74) *Attorney, Agent, or Firm*—Jenkins, Wilson, Taylor & Hunt, P.A.

(57) ABSTRACT

Methods and systems for dynamic, distributed link table consistency management are disclosed. A method for dynamic, distributed link table consistency management includes requesting, from each link interface module that maintains a link table in a distributed routing system, a link table checksum from the other link interface modules in the system. The requesting link interface module computes a checksum for its local link table and compares the computed checksum to the received checksums. In response to detecting a mismatch between the local checksum and one of the received link table checksums, the link interface module requests individual entry checksums from the link interface module with which a mismatch was detected. Inconsistencies between individual entries may be automatically corrected and/or reported to an operator.

24 Claims, 3 Drawing Sheets

METHODS AND SYSTEMS FOR DYNAMIC, DISTRIBUTED LINK TABLE CONSISTENCY MANAGEMENT

TECHNICAL FIELD

The present invention relates to methods and systems for link table consistency management. More particularly, the present invention relates to methods and systems for dynamic, distributed link table consistency management.

BACKGROUND ART

In telecommunications network signaling routers, such as signal transfer points, link interface cards each maintain identical copies of signaling link tables. Each link table includes individual entries corresponding to all of the signaling links in the system. Each entry includes the signaling link, the point code or other type of network address corresponding to the signaling link, and a status and/or cost associated with the route corresponding to each signaling link. The signaling link tables are used to route messages from inbound signaling links to outbound signaling links. For example, when a message arrives at one link interface card, the link interface card examines the destination address in the message, performs a lookup in its link table to determine the outbound signaling link for the message, and forwards the message to the signaling link interface card associated with the outbound signaling link for the message.

Because an incoming signaling message can be potentially routed over any of the signaling links on any card in the system, the signaling link tables maintained by each card must be complete and consistent with each other. For example, if a link on one card goes out of service, the signaling link tables on all of the cards in a system must be updated to indicate that the link is out of service. Any delay in performing these updates can result in unnecessary backplane traffic due to messages being routed to cards whose links are out of service.

One conventional method for link table consistency checking is to use a centralized operations, administration, and maintenance (OA&M) card to periodically compare link tables in the system to each other and report inconsistencies to an operator. According to this method, the OA&M card requests that each link interface card compute a checksum of its signaling link table and forward the checksum to the OA&M card. The OA&M card then compares the checksums of the individual cards. If there is a mismatch, the OA&M card reports the fact that there has been a mismatch to an operator. The operator must then manually compare individual signaling link table entries to determine the cause of the mismatch. While this method will eventually result in detection of the link that caused the inconsistency, this method is labor intensive. In addition, if the OA&M card fails, the consistency checking of all link cards will also fail.

Accordingly, in light of these difficulties associated with conventional signaling link table consistency management, there exists a need for improved methods and systems for dynamic, distributed link table consistency management.

SUMMARY OF THE INVENTION

The present invention includes improved methods and systems for dynamic, distributed link table consistency management. According to one method, rather than using a centralized OA&M card to perform link table consistency management, each card verifies its link table by requesting link table information from other cards. For example, each card may periodically request a checksum of a link table from every other card in the system. If the link table checksums do not match, the card may request individual table entry checksums from the card with which its link table did not match. Once the card detects the entry or entries that caused the mismatch, the card can take corrective action, such as reporting the entry that caused the mismatch to an operator and/or automatically correcting the mismatching entry.

Using checksums to detect full table and individual entry inconsistencies eliminates the need for sending complete copies of signaling link tables over the internal bus or backplane to identify inconsistencies. However, the present invention is not limited to using checksums to detect the inconsistencies. Using any suitable error detecting code for detecting inconsistencies between link table entries is intended to be within the scope of the invention.

In the examples below, the methods and systems for dynamic, distributed link table consistency management will be described in terms of block diagrams and flow charts. It is understood that the steps and functional blocks in these diagrams may be implemented in hardware, software, firmware, or any combination thereof.

Accordingly, it is an object of the invention to provide methods and systems for dynamic, distributed link table status management.

It is another object of the invention to provide methods and systems for automatically identifying individual link table entries that result in table inconsistencies and automatically correcting the entries.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DESCRIPTION OF THE INVENTION

Figure 1:
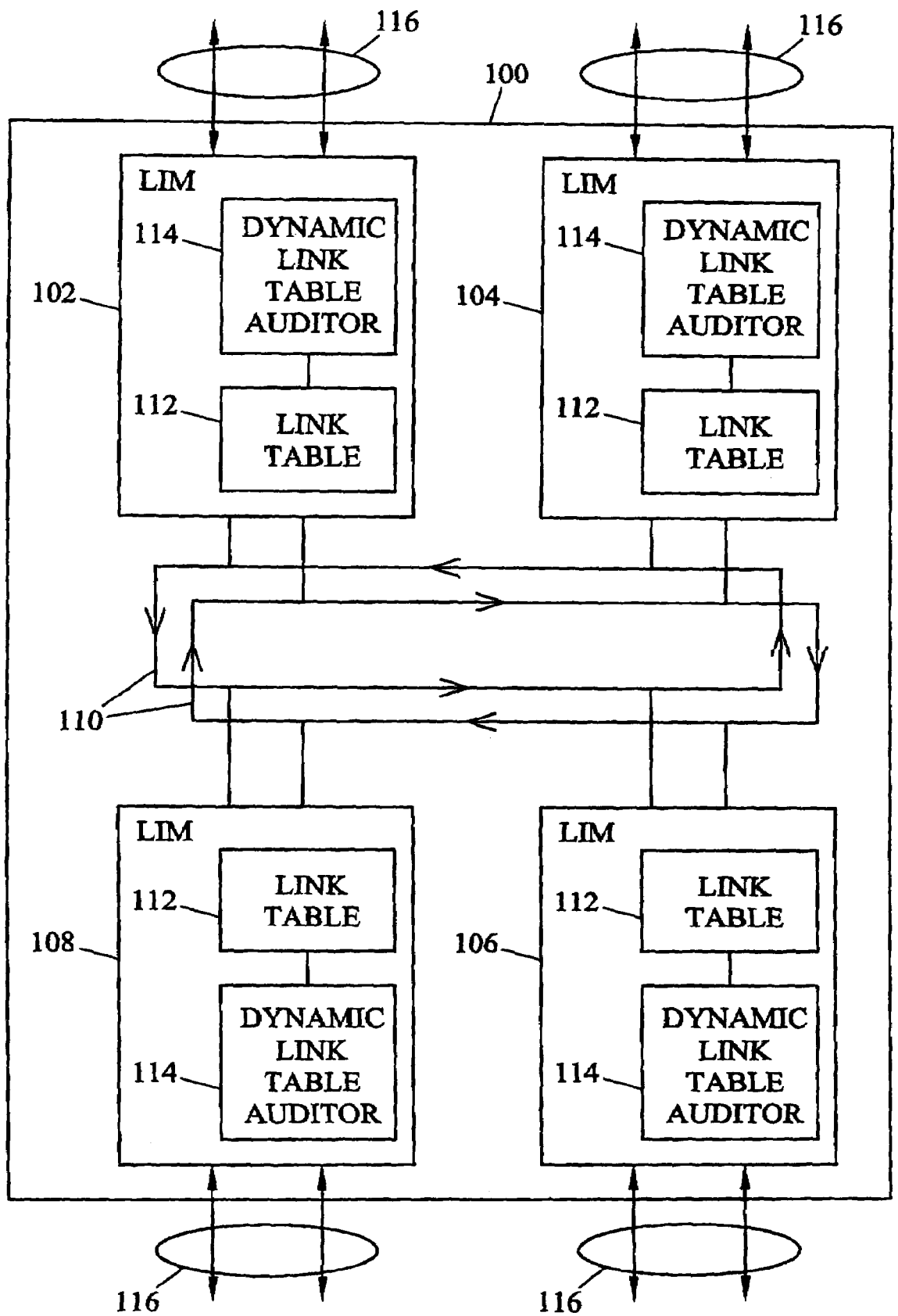
FIG. 1 is a block diagram of a signaling message routing node including a plurality of dynamic link table auditors according to an embodiment of the present invention.

FIG. 1 is a block diagram illustrating a signaling message routing node including a plurality of dynamic, distributed link table auditors according to an embodiment of the present invention. Referring to FIG. 1, signaling message routing node 100 may be any type of routing node in which link tables on multiple different link interface cards are required to be the same. For example, signaling message routing node 100 may be an SS7 signal transfer point with a distributed internal architecture where messages arriving on one link interface card may be routed to another link interface card. The link interface modules may route SS7 signaling messages over SS7 signaling links or IP signaling links, depending on the particular network implementation. In the illustrated embodiment, signaling message routing node 100 includes a plurality of link interface modules 102, 104, 106, and 108. From a hardware perspective, each link interface module may include an application processor for performing various signaling applications and a communications processor for communicating with other link interface modules over buses 110.

From a software perspective, each link interface module may include a link table 112 for routing signaling messages and a dynamic link table auditor 114 for maintaining consistency of link tables 112. Link tables 112 include routing entries, where each entry has an address to be compared with a destination address in a received signaling message to determine where the signaling message should be routed. Each entry also includes the address of the card associated with a signaling link 116 over which a message is to be routed. Since a message arriving on any of signaling links 116 can be routed over any of the other signaling links, each link table 112 is required to the same. In addition, in order to prevent messages from being routed to cards in which signaling links are out of service, each entry in link tables 112 also contains a status identifier indicating whether a given signaling link is in service or out of service.

Figure 2:
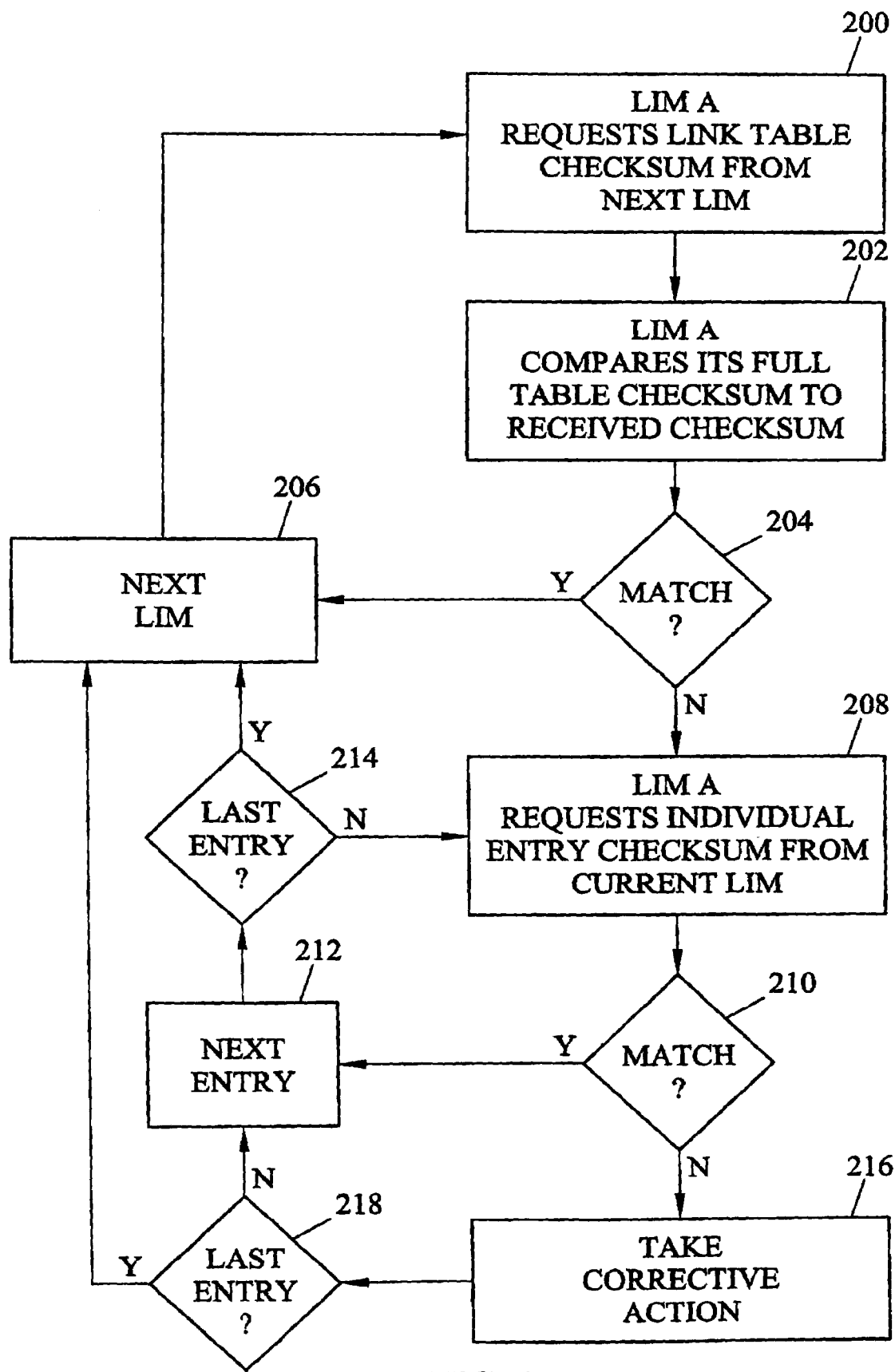
FIG. 2 is a flow chart illustrating a method for dynamic, distributed signaling link consistency management according to an embodiment of the present invention.

Dynamic link table auditors 114 perform dynamic, distributed link table consistency management according to the invention. FIG. 2 is a flow chart illustrating exemplary steps that may be performed by dynamic link table auditors 114 in maintaining consistency among link tables 112 according to an embodiment of the present invention. Referring to FIG. 2, in step 200, a first LIM, LIM A, requests a link table checksum from the next LIM in the system. The next LIM may be any of the LIMs in the system. In step 202, LIM A compares its full table checksum to the received checksum. In step 204, if the full table checksums match, control proceeds to step 206 where LIM A determines the next LIM in the system and repeats steps 200-204. Steps 200-204 may be repeated periodically by each LIM in the system.

In step 204, if the full table checksums do not match, control proceeds to step 208 where LIM A requests individual entry checksums from the current LIM being tested. This step may be performed by sending a request message from LIM A to the LIM with which LIM A's link table is being compared. In response to the individual entry checksum request, the LIM being compared with LIM A may send some or all of its individual entry checksums to LIM A. LIM A may then begin comparing its individual entry checksums to the received individual entry checksums. In step 210, if the first individual entry checksum matches, control proceeds to step 212 where the next entry is checked. In step 214, if the next entry is not the last entry, control returns to steps 208 and 210 where the next entry is checked.

If, in step 210, one of the entries does not match, control proceeds to step 216 where a corrective action is taken. Taking corrective action may include automatically reporting the mismatching entry to the operator and/or automatically correcting the mismatching entry. In one exemplary embodiment, each link interface module may be the owner of the signaling links that it terminates. That is, a link interface module that terminates a particular signaling link is considered to be the most reliable source of information regarding the status of the particular signaling link. Accordingly, if there is a mismatch, the link table on the card that terminates a link may be used to correct any inconsistencies in the link tables on other cards. Accordingly, when LIM A locates a mismatching entry in its link table, LIM A may determine the link interface module that is the owner of that entry. This determination may be made by extracting the card bus address that corresponds to the mismatching entry from the local link table. Once LIM A determines the card address of the card that is the owner of the mismatching entry, LIM A may request up-to-date link status information from that card for the mismatching entry. The receiving card responds to the request, and LIM A may then correct its link table based on the response from the link owner.

Once corrective action has been taken, control proceeds to step 218 where it is determined whether the entry being checked is the last entry in the table. If the entry is the last entry in the table, control returns to step 206 where the link table on the next LIM is checked using steps 200-216 described above. If the next entry is not the last entry, the remaining entries in the link table being tested are checked and corrective action may be taken for each mismatching entry.

The steps illustrated in FIG. 2 may be performed by each dynamic link table auditor on each LIM. Accordingly, unlike conventional implementations where link table consistency checking was centralized and subject to centralized failure, the present invention increases the robustness of link table consistency checking by performing such checking in a distributed manner. If one dynamic link table auditor fails, the link table consistency checking for that card only will be disabled. In addition, by automatically identifying individual entries that caused link table inconsistencies, the present invention reduces the need for manually checking link entries to located inconsistencies. As a result, the present invention greatly increases the efficiency of link table consistency checking over conventional implementations.

Although in the method illustrated in FIG. 2, a link interface module sequentially checks its table against the link tables of other link interface modules, the present invention is not limited to such an embodiment. In an alternate embodiment, a link interface module may broadcast a link table checksum request to all of the other link interface modules in the system. The other link interface modules may respond to the request. The link interface module may then check its link table checksum against all of the received link table checksums. If the link interface module detects a mismatch between full table checksums, the link interface module may request and correct any individual entry checksums in the manner described above with regard to FIG. 2.

Figure 3:
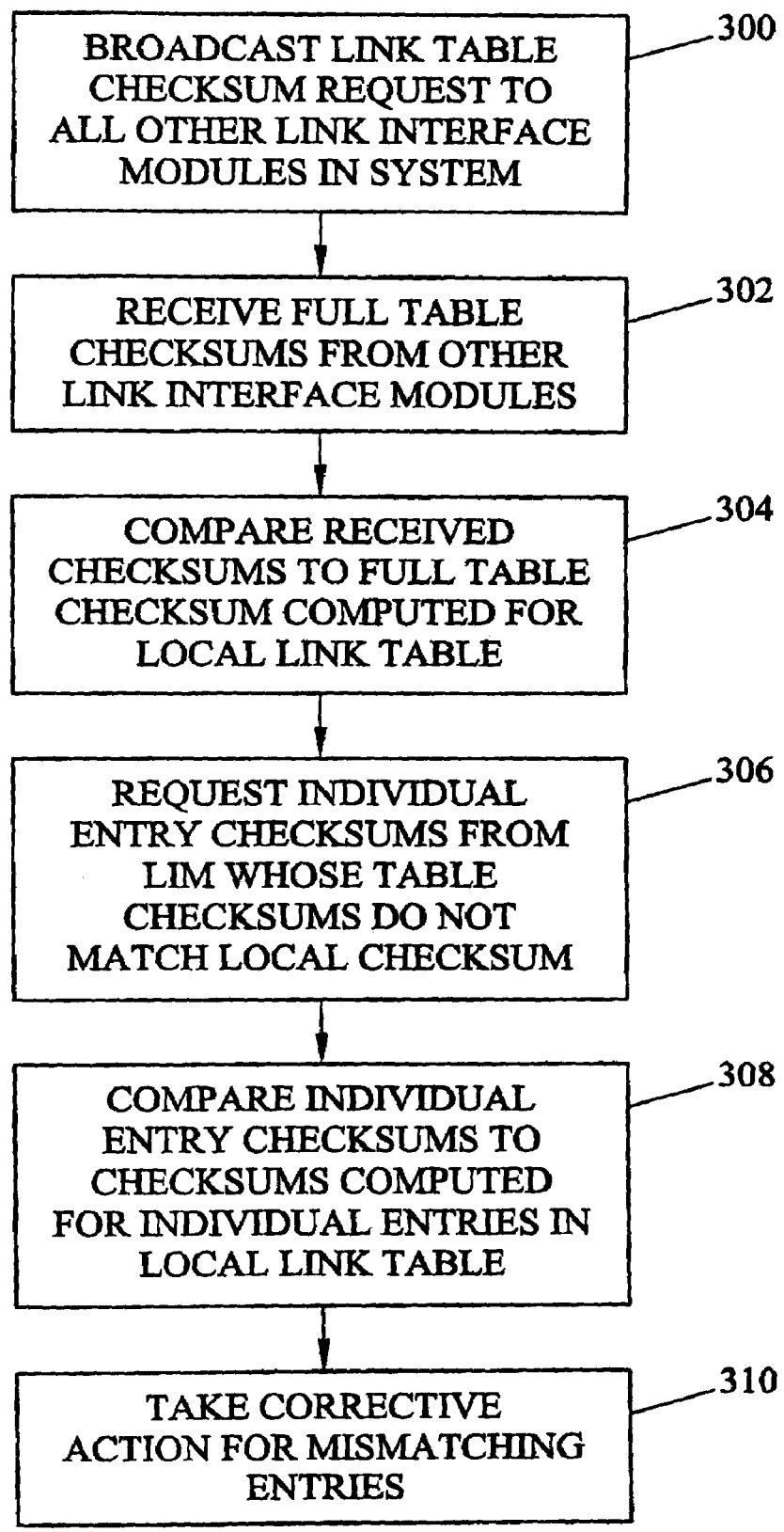
FIG. 3 is a flow chart illustrating a broadcast method for dynamic, distributed link table consistency management according to an embodiment of the present invention.

FIG. 3 is a flow chart illustrating an exemplary broadcast method for dynamic, distributed link table consistency management according to an embodiment of the present invention. Referring to FIG. 3, in step 300, a link interface module broadcasts a link table checksum request to all other link interface modules in the system. The request may be sent over buses 110 illustrated in FIG. 1. In response to the request, each link interface module sends a full table checksum to the requesting module. Accordingly, in step 302, the receiving link interface module receives the full table checksums from the other link interface modules.

In step 304, the receiving link interface module compares the received checksums to a full table checksum computed for its local link table. In step 306, the receiving link interface module requests individual entry checksums from LIMs whose table checksums do not match the local checksum. In step 308, the requesting LIM compares individual entry checksums to the checksums computed for individual entries in the local link table. In step 310, the receiving LIM takes corrective action for mismatching entries. As discussed above, taking corrective action may include notifying an operator of specific mismatching entries and/or automatically correcting the entries.

The steps illustrated in FIG. 3 may be used by each link interface module in the system to maintain consistency of its local link table with the link tables of other LIMs in the system. Because a broadcast method is used, the time required to perform the consistency checking is reduced over the sequential method illustrated in FIG. 2. Moreover, like the method described with regard to FIG. 2, because link table consistency checking is distributed, there is no longer a central point of failure for link table consistency checking. In addition, because individual cards may be the owner of the links that they terminate, corrective action can be taken based on the link interface module having the most direct knowledge of the signaling link at issue.

Although the examples described above are described in terms of detecting and correcting inconsistencies in signaling link status information among signaling link tables, the present invention is not limited to detecting and correcting signaling link status information. The methods and systems described herein for dynamic, distributed link table status management may be used to correct any inconsistencies in corresponding entries of signaling link tables.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for dynamic distributed link table consistency management, the method comprising:
   (a) maintaining, on a plurality of different link interface modules for routing signaling messages in a distributed signaling message routing system, a plurality of signaling link tables having the same signaling link entries, wherein each signaling link table is used by one of the link interface modules to route signaling messages from inbound to outbound signaling links;
   (b) sending a signaling link table data error detecting code request from a first link interface module having a first signaling link table to a second link interface module having a second link interface table;
   (c) at the second link interface module, in response to the request, computing a data error detecting code for the second signaling link table and sending the data error detecting code to the first link interface module;
   (d) at the first link interface module, computing a data error detecting code for the first signaling link interface table and comparing the data error detecting code computed for the first signaling link table to the data error detecting code received from the second link interface module;
   (e) in response to detecting a match between the data error detecting codes, repeating steps (b)-(d) for the next link interface module in the system; and
   (f) in response to failing to detect a match between the data error detecting codes, taking corrective action.

2. The method of claim 1 wherein maintaining a plurality of signaling link tables includes maintaining a plurality of SS7 signaling link tables.

3. The method of claim 1 wherein maintaining a plurality of signaling link tables includes maintaining a plurality of IP socket tables.

4. The method of claim 1 wherein taking corrective action includes:
   at the first link interface module:
   (a) sending an individual entry data error detecting code request from the first link interface module to the second link interface module;
   (b) receiving the individual entry data error detecting code from the second link interface module and computing an individual entry data error detecting code for an entry in the first signaling link table;
   (c) comparing the individual entry data error detecting code received from the second link interface module to the data error detecting code computed for the individual entry by the first link interface module;
   (d) in response to detecting a match of the individual entry data error detecting codes, repeating the individual entry checks for each entry in the first signaling link table; and
   (e) in response to failing to detect a match between individual entry data error detecting codes, performing a predetermined corrective operation.

5. The method of claim 4 wherein performing a predetermined corrective operation includes reporting the individual entry mismatch to an operator.

6. The method of claim 4 wherein performing a predetermined corrective operation includes correcting at least one of the individual entries.

7. The method of claim 6 wherein correcting at least one of the individual entries includes correcting the entry in the first signaling link table to match a corresponding entry in a signaling link table on a link interface module that terminates the signaling link corresponding to the entry.

8. The method of claim 7 wherein correcting at least one of the individual entries includes correcting link status information in the entry in the first link interface table.

9. A method for dynamic, distributed link table consistency management, the method comprising:
   (a) broadcasting a signaling link table data error detecting code request from a first link interface module having a first signaling link table to a plurality of second link interface modules having second signaling link tables, wherein the first and second signaling link tables are respectively used by the first and second link interface modules to route signaling messages from inbound to outbound signaling links;
   (b) receiving full signaling link table data error detecting codes from the second link interface modules;
   (c) comparing the received data error detecting codes to a full signaling link table data error detecting code computed for the first signaling link table;
   (d) requesting individual entry data error detecting codes from the second link interface modules having full signaling link table data error detecting codes that do not match the full signaling link table data error detecting code computed for the first signaling link table;
   (e) receiving the individual entry data error detecting codes from the second link interface modules having full signaling link table data error detecting codes that do not match the full table data error detecting code computed for the first signaling link table and comparing the individual entry data error detecting codes to individual entry error detecting codes computed for the first signaling link table; and
   (f) taking corrective action for the mismatching entries.

10. The method of claim 9 wherein broadcasting signaling link table data error detecting code requests to a plurality of second link interface modules includes broadcasting link table data error detecting code requests to a plurality of SS7 signaling link interface modules.

11. The method of claim 9 wherein broadcasting signaling link table data error detecting code requests to a plurality of second link interface modules includes broadcasting the link table data error detecting code request to a plurality of SS7 over IP signaling link interface modules.

12. The method of claim 9 wherein taking corrective action includes informing an operator of mismatching signaling link table entries.

13. The method of claim 9 wherein taking corrective action includes automatically correcting the mismatching entries.

14. The method of claim 13 wherein automatically correcting the mismatching entries includes identifying the owner of a signaling link table entry and requesting current link table entry status information from the owner.

15. A system for dynamic, distributed link table consistency management, the system comprising:
   (a) a plurality of link interface modules for sending signaling messages to and receiving messages from external signaling links;
   (b) a plurality of link tables, one link table being located on each link interface module, each link table including entries having signaling message routing information and corresponding signaling link status information, wherein each signaling link table is used by one of the link interface modules to route signaling messages from inbound to outbound signaling links; and
   (c) a plurality of dynamic link table auditors, one link table auditor being located on each link interface module, each dynamic link table auditor being adapted to compare the link table on its associated link interface module with the link tables on other link interface modules for detecting data inconsistencies and to take corrective action in response to detecting data inconsistencies between the link tables.

16. The system of claim 15 wherein the link interface modules include SS7 link interface modules.

17. The system of claim 15 wherein the link interface modules include SS7 over IP signaling link interface modules.

18. The system of claim 15 wherein the link tables on each of the link interface modules include corresponding signaling link entries.

19. The system of claim 15 wherein the dynamic link table auditor on each link interface module is adapted to broadcast link table data error detecting code requests to the other dynamic link table auditors in order to check for data inconsistencies in signaling link status information between the link tables.

20. The system of claim 15 wherein the dynamic link table auditor on each link interface module is adapted to sequentially request link table data error detecting codes from the other dynamic link table auditors in order to check for inconsistencies between the signaling link tables.

21. The system of claim 15 wherein the dynamic link table auditor on each link interface module is adapted to check for data inconsistencies between individual entries in the signaling link tables.

22. The system of claim 21 wherein the dynamic link table auditor is adapted to report data inconsistencies in individual link table entries to an operator.

23. The system of claim 21 wherein the dynamic link table auditor is adapted to automatically correct individual signaling link table entries for which data inconsistencies are detected.

24. The system of claim 23 wherein, for each individual entry for which a data inconsistency is detected, the dynamic link table auditor is adapted to identify the owner of the mismatching entry and correct its link table entry to correspond to that of the owner.

* * * * *